(12) United States Patent
Caldwell et al.

(10) Patent No.: US 6,323,271 B1
(45) Date of Patent: Nov. 27, 2001

(54) POLYESTER RESINS CONTAINING SILICA AND HAVING REDUCED STICKINESS

(75) Inventors: Sarah E. Caldwell; Jennifer King; John Woodward, all of Spartanburg; Audrey C. Wu, Greenville; Jim Schwietert, Spartanburg, all of SC (US)

(73) Assignee: Arteva North America S.A.R.L., Zurich (CH)

( * ) Notice: Subject to any disclaimer, the term of this patent is extended or adjusted under 35 U.S.C. 154(b) by 0 days.

(21) Appl. No.: 09/185,494

(22) Filed: Nov. 3, 1998

(51) Int. Cl.$^7$ ..................................................... C08K 3/34
(52) U.S. Cl. ............................................. 524/492; 524/493
(58) Field of Search ........................... 524/493, 492, 524/601, 604, 605; 428/35.7

(56) References Cited

U.S. PATENT DOCUMENTS

| | | | |
|---|---|---|---|
| 3,515,626 | 6/1970 | Duffield et al. | 161/162 |
| 4,092,289 | 5/1978 | Remmington | 260/40 R |
| 4,417,011 | 11/1983 | Ohkawa et al. | 523/527 |
| 4,677,188 | 6/1987 | Utsumi et al. | 528/272 |
| 5,028,462 | 7/1991 | Matlack et al. | 428/35.7 |
| 5,039,780 | 8/1991 | Hashimoto et al. | 528/194 |
| 5,071,690 | 12/1991 | Fukuda et al. | 428/141 |
| 5,132,356 * | 7/1992 | Siddiqui | 524/493 |
| 5,162,154 | 11/1992 | Tucker | 428/520 |
| 5,240,779 * | 8/1993 | Ono et al. | 428/626 |
| 5,266,397 | 11/1993 | Ogawa et al. | 428/323 |
| 5,278,205 | 1/1994 | Siddiqui | 524/493 |
| 5,278,221 | 1/1994 | Sidduqui | 524/493 |
| 5,281,379 * | 1/1994 | Noguchi et al. | 264/102 |
| 5,336,704 | 8/1994 | Rainer | 524/30 |
| 5,336,709 * | 8/1994 | Antikow et al. | 524/493 |
| 5,354,595 | 10/1994 | Yamamoto et al. | 428/147 |
| 5,354,802 * | 10/1994 | Shiwaku et al. | 524/494 |
| 5,382,651 | 1/1995 | Kim et al. | 528/283 |
| 5,384,191 | 1/1995 | Ogawa et al. | 428/323 |
| 5,384,354 * | 1/1995 | Hasegawa et al. | 524/539 |
| 5,397,828 * | 3/1995 | Ihm et al. | 524/441 |
| 5,407,752 * | 4/1995 | Fukuzumi et al. | 428/480 |
| 5,415,930 * | 5/1995 | Etchu et al. | 428/323 |
| 5,475,046 | 12/1995 | Son et al. | 524/430 |
| 5,556,675 | 9/1996 | Yamanmoto et al. | 428/36.92 |
| 5,646,208 | 7/1997 | Cattron et al. | 524/128 |
| 5,686,510 * | 11/1997 | Asai et al. | 523/220 |
| 5,723,528 * | 3/1998 | Mason | 524/492 |
| 5,798,183 * | 8/1998 | Hosono et al. | 428/458 |
| 5,830,544 | 11/1998 | Kerscher et al. | 428/34.5 |
| 5,859,116 * | 1/1999 | Shih | 524/493 |
| 5,880,201 * | 3/1999 | Enomoto et al. | 524/492 |
| 5,939,471 * | 8/1999 | Wanatabe et al. | 523/334 |

FOREIGN PATENT DOCUMENTS

| | | |
|---|---|---|
| 0 502 208 | 4/1992 | (EP) . |
| 0 506 033 | 9/1992 | (EP) . |
| 0 526 117 | 2/1993 | (EP) . |
| 56-18645 | 2/1981 | (JP) . |
| 56-21833 | 2/1981 | (JP) . |
| 4-136063 | 5/1982 | (JP) . |
| 57-105449 | 6/1982 | (JP) . |
| 4-180938 | 6/1992 | (JP) . |
| 4-288353 | 10/1992 | (JP) . |
| 4-309523 | 11/1992 | (JP) . |
| 5-86270 | 4/1993 | (JP) . |
| 5-86272 | 4/1993 | (JP) . |

\* cited by examiner

*Primary Examiner*—Edward J. Cain
*Assistant Examiner*—Katarzyna Lee Wyrozebski
(74) *Attorney, Agent, or Firm*—Gregory N. Clements

(57) ABSTRACT

The invention is directed to polyester resins containing a silica selected from the group consisting of fumed silica, colloidal silica and silica beads, which resin has utility on the production of containers, particularly beverage containers, having reduced stickiness relative to containers made from the same resin but without the silica.

45 Claims, No Drawings

POLYESTER RESINS CONTAINING SILICA AND HAVING REDUCED STICKINESS

FIELD OF THE INVENTION

This invention is directed to polyester resins containing fumed silica to improve the processability of the resins in the production of articles of manufacture. In particular, the invention is directed to polyester resins containing fumed silica, which resins are suitable for the productions of beverage bottles. This application is related to an application titled "Poly(Terephthalic Acid Diester)-Poly(Isophthalic Acid Diester) Resin Formulations Having Improved Gas Barrier Properties", application Ser. No. 09/185,237, which was filed concurrent with this application and whose teaching are incorporated herein.

BACKGROUND OF THE INVENTION

The use of polyester compositions as a packaging material, particularly, compositions comprising polyethylene terephthalate, generally referred to as "PET", in the form of films, plastic bottles and other containers is well known. Plastic bottles are used for containing pressurized fluids such as carbonated drinks, e.g., soft drinks or mineral waters, as well as for non-carbonated, non-pressurized drinks. To form plastic bottles, the polymer is extruded and then formed into chips. The chips are employed to make a bottle preform by injection molding as is well known in the industry. The preform is then reheated and blown into a mold which provides the final shape of the bottle.

During the manufacture of bottles, one problem often encountered is that of "stickiness", wherein the newly formed bottles or bottle preforms have a tendency to stick to surfaces, including each other. This can give rise to problems during the conveying and palletizing of the bottles which disrupt operations. While various approaches to solving this bottle problem have been tried, none have been satisfactory until the invention disclosed herein, particularly under economic considerations which require high production rates.

The approach to solving the stickiness problem disclosed herein is to increase the surface roughness of the bottles by the addition of particulate matter to the resin prior to using the resin to form bottles. With increased roughness, bottle-to-bottle or bottle-to-other-surface contact will be minimized, or the bottles will have a lesser tendency to stick to each other and will thus not cause interruptions in operations. While a variety of substances have been evaluated for reducing stickiness, including fumed silica (sometimes called pyrogenic silica), colloidal silica and silica beads, it has been determined that amorphous and fumed silicas are most advantageous for reducing stickiness.

Silica has been used in the production of polyester films for a variety of uses. For example, U.S. Pat. Nos. 5,384,191 and 5,266,397 to Ogawa et al. describe the preparation of an amorphous silica filler and its incorporation into a film resin to improve, among other things, the scratch resistance properties of the surface of films prepared using such resin; U.S. Pat. No. 5,281,379 to Noguchi et al. describes a process for producing thermoplastic resin compositions which includes adding fine particles, including silica, of less than 10 μm particle size to a variety of polymer resins, including polyester resins. Other U.S. Patents teaching polyester resins suitable for the production of films and including, among other things, silica in combination with a polyester resin, are U.S. Pat. No. 5,475,046 to Son et al. (polyester with macro particles of silica and aluminum oxide); U.S. Pat. No. 5,382,651 to Kim et al (polyester with silica produced from an ethylene glycol silica sol); U.S. Pat. No. 5,336,709 (undrawn polyester yarns containing fumed silica); U.S. Pat. Nos. 5,278,221 and 5,278,205 (polyester film containing glass beads and fumed silica); and U.S. Pat. No. 4,029,289 (polyester film resin containing pyrogenic aluminum and pyrogenic silica). While film resins have incorporated various silicas for a variety of reasons, similar teachings have not been found in the art related to polyester resins suitable for use in the production of containers, particularly bottles. This is most likely due to the fact that incorporation of particulates into bottle resins causes haziness, making the resins unsuitable for many bottle uses.

Therefore, it is a object of the invention to describe polyester resins incorporating, among other things, fumed silica, colloidal silica, precipitated silica and silica beads, and a process for producing such resins. Fumed silicas are preferred.

A further object of this invention is to describe polyester resins suitable for the production of containers which incorporate, among other things, fumed silica to improve the processing characteristics of such resins and the products made therefrom, and a process for producing such resins.

An additional object of this invention is to describe polyester resins comprising, among other things, polyethylene terephthalate, and similar terephthalate polyesters, and fumed silica, and a process for making same.

A further object of the invention is to describe a resin comprising, among other things, polyethylene terephthalate and fumed silica which is suitable for the production of beverage containers and which has improved handling characteristics during the production of same.

SUMMARY OF THE INVENTION

The invention is directed to a polyester resin suitable for the production of containers and particularly beverage containers including clear polyester bottles; such resins containing, among other things, polyethylene terephthalate and a siliceous substance, particularly about 50 to about 2500 ppm by weight fumed silica of particle size of about 0.1 μm to about 30 μm, preferably about 0.1 μm to about 5 μm, and more preferably from about 0.1μm to about 3 μm, and most preferably from about 0.1 μm to about 1.5 μm.

The invention is further directed to a process for producing a polyester resin suitable for the production of containers, particularly beverage containers, such process having, among other steps:

(a) a step of mixing together, among other things, at least one polycarboxylic acid substance or diester thereof suitable for the production of a polyester resin and a polyol suitable for the production of a polyester resin;

(b) heating the mixture of step (a);

(c) removing from the product of step (b) excess or unreacted glycol or water present or produced; and (d) optionally, solid stating the product of step (c) to produce a silica-containing polyester resin suitable for the production of containers;

wherein fumed silica or other siliceous substance is added to the process at any of steps (a), (b), (c) and (d) to produce said polyester-silica resin.

In an alternate embodiment of the invention fumed silica is added to a polyester resin in a vessel, or a mixture of polyesters and other resins as described herein, and the resulting mixture is heated and mixed to a temperature at or above the melting point of the polyester. The silica can be added before or after the polyester has reached its melting point. The vessel can be any vessel suitable for accomplishing the mixing, for example, a resin bottle or an extruder.

DETAILED DESCRIPTION OF THE INVENTION

The term "polyester" as used herein means any substance formed by the reaction between at least one polyhydric alcohol (a polyol, a substance containing two or more hydroxyl groups) and a dicarboxylic acid or a mono- or diester of a dicarboxylic acid. In the preferred embodiments of the invention, the preferred dicarboxylic acids and esters thereof are those in which two carboxylic acid groups (—COOH), are attached to the same or different aromatic or saturated rings, be such rings fused or bonded together. Examples include terephthalic acid, isophthalic acid, naphthalene dicarboxylic acid (fused aromatic rings), 4,4'-biphenyl dicarboxylic acid (aromatic rings bonded at 1,1' positions), 4,4'-bicyclohexane dicarboxylic acid (saturated ring bonded at the 1,1' position), and similar substances, including mono- and diesters, known to those skilled in the art. When using mono- or diesters, the preferred esterifying groups are $C_1$–$C_6$ alcohols, for example, methanol, ethanol, propanol, iso-propanol, cyclohexanol and similar alcohols.

The term "polyhydric alcohol" as used herein means any substance containing two or more hydroxyl groups. Examples include ethylene glycol, diethylene glycol, triethylene glycol, propylene glycol, dipropylene glycol, butylene glycol, 1,4-cyclohexane diol and similar substances containing two or more hydroxyl groups.

The "PET" as used herein means both polyethylene terephthalate specifically and generally all polyesters which are suitable for practicing the invention, including mixtures thereof; for example, polyethylene terephthalate-polyethylene isophthalate mixtures.

Fumed silica ("FS") and colloidal silica ("CS") of size about 0.1 μm to about 5 μm, preferably about 0.1 μm to about 3 μm, and most preferably from about 0.1 μm to about 1.5 μm, and silica beads ("SB") of size about 0.5 to about 3 μm, preferably from about 1 μm to about 3 μm can be used in practicing the invention. (The term "beads" means any shape having smooth, curved edges, including spherical, oblate and other shapes.) Preferred are fumed silica and colloidal silica because, in addition to reducing stickiness, these materials give rise to less haze in a finished container, for example, a bottle, than do the silica beads. Most preferred are fumed silicas. All such materials are commercially available and, for uses in food containers such as beverage containers, should be approved for food packaging use. The silica beads used herein were purchased under the tradename KEP-150. Also useful in practicing the invention is a synthetic silicone product from GE Silicones which is sold under the tradename Tospearl. Fumed silicas are available from Cabot Corporation, Cab-O-Sil Division, Tuscola, Ill., under the tradename Cab-O-Sil. Colloidal and precipitated silicas are available from Nalco Chemical Company, Naperville, Ill.

Fumed silicas are white, free-flowing powders and are generally hydrophilic due to the presence of hydrophilic groups on the silica surface. The particles have a wide range of size which is dependent on the manufacturing process and the degree of agglomeration and mechanical entanglement which occurs during the manufacturing process and after cooling below the fusion point of silica. As a result, particles may range in size from about 100 nm (nanometer) to greater than 1000 nm (about 0.1 μm to greater than 1 μm). It was observed that as a result of such aggregation or agglomeration, fumed silica samples as obtained contained particles as large as 30 μm, which may be reduced in size upon solutioning or application of mixing. However, it was further observed that even when the particles size was reduced before addition of the fumed silica to the resin, bottles prepared from such resin contained particles as large as 20 μm and that such bottles were non-sticky. Consequently, the range of fumed silica particle sizes which can be used in practicing the invention is large, ranging from about 100 nm to about 30,000 nm.

The Cab-O-Sil® M-5P silica used in the examples herein is reported by the manufacturer as being a three-dimensional branched-chain aggregate with a length of about 150 to about 200 nanometers and a mean aggregate diameter when dispersed in water of about 173 nm. A scanning electron micrograph of M-5P contained in the manufacturer's literature indicates that mechanical entanglement can increase particle size to over 1000 nm. Accordingly, based on experience herein with fumed silica, colloidal silica and silica beads, silica material of about 100 nm to about 5000 mn (5 μm) preferably from about 100 nm to about 1500 nm, can be used in practicing the invention.

The amount of silica material added to a resin intended for bottle use is from about 50 ppm (parts-per-million by weight) to about 2500 ppm, preferably from about 1000 ppm to about 2000 ppm. The exact amount is dependent on the silica type. For example, less than 250 ppm silica beads are used in practicing the invention when clear, unhazed bottles are desired because the silica beads were more effective than other additives and thus lower levels could be used. When smaller size beads are available or when other silica additives are used, a higher amount may be used or may be necessary. Effectiveness was found to be a balance between additive particle size and the amount added. For example, when silica beads of about 1.5 μm size are compared to Tospearl of about 0.5 to about 2.0 μm size, it was found that a lesser amount of silica beads was required. If haziness is not a problem, for example, in the production of highly colored or opaque bottles, then an amount up to about 2500 ppm, and even higher, can be used.

The silica material may be added to the resin at any stage of the resin manufacturing process. Alternatively, a resin can be manufactured and remelted to allow addition of the silica material, with mixing, prior to the use of the resin in the container manufacturing process. From a manufacturing and economic viewpoint, the silica material is advantageously added to and mixed with the resin during the polycondensation step.

The following examples are given to illustrate the invention, the process for making the silica-containing resins of the invention, and the utility of such resins for manufacturing containers, particularly beverage containers. Furthermore, although the main thrust of the present invention is directed toward polyester bottles, bottles comprising about 80% polyester, including mixtures of polyesters, and about 20% of other compatible polymers such as polyethylene, polypropylene, polyamides and similar polymers are also within the scope of the present invention.

Resin Manufacture

EXAMPLE A

Suitable polyesters can be produced in a conventional manner by the reaction of a dicarboxylic acid having 2 to 40 carbon atoms with polyhydric alcohols such as glycols or diols containing from 2 to about 20 carbon atoms. Methods known to those skilled in the art, including known or novel catalysts, sequestering and quenching agents, and additives are used in practicing the invention. Excellent references for methods of producing polyester materials and combinations of polyesters with other polymeric materials include W. R. Sorenson and T. W. Campbell, "Preparative Methods of Polymer Chemistry," (Interscience Publishers, New York 1968, and subsequent editions) and the "Encyclopedia of Polymer Science; and Engineering, 2nd Ed.," H. F. Mark et al., (John Wiley & Sons, New York 1985), particularly Volume 12, pages 1–290 (polyesters generally) and especially pages 259–274 for resin manufacturing processes.

The dicarboxylic acid can be an alkyl dicarboxylic acid having 2 to 20 carbon atoms, or an aryl- or alkyl-substituted aryl dicarboxylic acid containing from 8 to 16 carbon atoms. Additionally, an alkyl dicarboxylic acid diester having from 4 to 20 carbon atoms or an alkyl-substituted aryl dicarboxylic acid diester having from 10 to 20 carbon atoms can be utilized in place of the dicarboxylic acid.

Polyhydric glycols or diols containing from 2 to 8 carbon atoms are particularly preferred, and most preferred is ethylene glycol. Moreover, glycol or diol ethers having from 4 to 12 carbon atoms may be substituted for the glycol or diol.

The most commonly produced polyester, a terephthalate polyester, is made from either dimethyl terephthalate or terephthalic acid with ethylene glycol (PET) or from either dimethyl terephthalate or terephthalic acid with 1,4-cyclohexane diol (PCT). Suitable dicarboxylic acids include terephthalic acid, isophthalic acid, malonic, succinic, glutaric, adipic, suberic, sebacic, maleic and fumaric acid, all of which are well known dicarboxylic acids, or mixtures of these such that a copolyester is produced. Suitable glycols, in addition to ethylene glycol and 1,4-cyclohexane diol, include propylene glycol, 1,3-propanediol, glycerol, 1,2-butanediol, 1,4-butanediol, pentaerythritol, neopentylglycol, and similar glycols and diols, and mixtures thereof, all of which are well known in the art and can be used to produce a polyester or copolyester.

Conventional production of polyethylene terephthalate (and other polyesters, for example, other terephthalate, isophthalate and mixed terephthalate-isophthalate polyesters) comprises reacting terephthalic acid or dimethyl terephthalate with ethylene glycol at a temperature of about 200 to about 250° C. forming monomer and water (or methanol). Because the reaction is reversible, the water (or methanol) is continuously removed, driving the reaction to the production of monomer. Next, the monomer undergoes a polycondensation reaction to form the polymer. During the reaction of the terephthalic acid or dimethyl terephthalate and ethylene glycol, it is not necessary to have a catalyst present although it may be advantageous to do so in order to increase the rate of reaction. Generally, during the polycondensation reaction, the use of a catalyst is preferred, for example, antimony compounds or other catalyst known to those skilled in the art. In the making of bottle preforms and plastic bottles from the preforms, it is often desired to produce the cleanest, clearest polymer. Generally, the less additives employed, the clearer the polymer produced. On the other hand, it is sometimes desirable to make a colored plastic bottle which means that the bottle preform may also be colored. Accordingly, various pigments, dyes, fillers and other substances known to those skilled in the art may be added to the polymer, generally during or near the end of the polycondensation reaction. The specific additives used and the point of introduction during the reaction does not form a part of this invention, and this technology is well known in the art. Any conventional system may be employed and those skilled in the art can pick and choose among the various systems for the introduction of additives to select the best for the desired result.

Any finely divided silica or siliceous substance as described herein is suitable for use in practicing the present invention, the primary limitations being:

(1) if the polymer is to be used in any food, pharmaceutical, medicinal or similar packaging, that the substances are approved for such uses as packaging materials or for contact with such products, and (2) that when the substances are uniformly dispersed within the polymer, and when polymer is injection molded into bottle preforms and subsequently blow-molded into plastic bottles, no visible particles of the substance should be readily detected by the naked eye (for translucent articles only).

Uniformly dispersing the particles into the polymer can result in the particles becoming more finely divided.

The silica particles may be introduced into the polyester production process at any time. For example, if an ester and a glycol are being reacted, the silica particles can be introduced during the ester interchange reaction or during the polycondensation reaction. If a terephthalic acid and glycol reaction are being employed to make polyester, the silica particles can be introduced any time during the esterification reaction or during the polycondensation reaction. The amount of silica particles employed may range from about 50 ppm up to about 2,500 ppm based upon the weight of the resin, preferably about 100 to about 2000 ppm when fumed or colloidal silica is used.

EXAMPLE B

In this Example, a polyester material is made or purchased, and is subsequently combined with a silica substance according to the invention to produce a silica containing polyester resin. For example, PET chip or pellets of about 3×3 mm (diameter×length) were fed into a twin-screw kneading extruder along with sufficient silica material to produce a mix containing about 150 to about 2000 ppm silica substance. The mix was passed through various heating zones to a zone having a temperature of about 280 to about 290° C., during which time the PET is melted and the silica is uniformly mixed therewith. Subsequently, the silica-containing resin may either:

(1) be extruded from the kneading extruder, processed into chips, pellets or other shapes suitable for use by container manufacturers, and shipped to such manufacturers for use in manufacturing containers; or (2) be transferred downstream in a molten state to equipment suitable for the manufacture of containers or container preforms.

In either case, the siliceous polyester resin can be used to form containers, for example, bottles.

Resin Evaluation

EXAMPLE 1

Resins containing various silicas were prepared according to Example B. The resins were melted, injection molded into bottle preforms and blow molded into 2 liter bottles using methods and equipment known to those skilled in the art. Coefficient of friction testing using ASTM D1894 was carried out on the bottle sidewalls to determine the effect of the various silicas on bottle stickiness. The control was the PET resin of Example B without silicas. The static coefficient of friction test results, $\mu s$, are given in Table 1. The results indicate that fumed silicas (FS), colloidal silicas (CS), and silica beads (SB) each reduce stickiness when compared to the control resin. In addition, a PET resin containing an internal lubricant, KPL-155 (available from Kao Corporation), was also evaluated.

TABLE 1

| Resin | Additive Level ppm | Average μs | Std. Dev. |
|---|---|---|---|
| PET Control | None | 3.89 | 1.83 |
| PET + FS | 150 | 1.42 | 0.83 |
|  | 1500 | 0.42 | 0.08 |
| PET + CS | 150 | 1.66 | 1.38 |
|  | 1500 | 0.24 | 0.10 |
| PET + SB | 50 | 0.51 | 0.28 |
|  | 150 | 0.31 | 0.08 |
| PET + KPL-155 | 10,000 | 2.48 | 2.33 |
|  | 30,000 | 1.21 | 0.57 |

Although all three types of silica effectively reduced the static coefficient of friction, the use of silica beads was deemed unacceptable for the production of clear bottles because they induced an unacceptable level of haziness in the bottles even at the 50 ppm level (although if haziness is not a concern, SB at any levels as taught herein may be used). At the 150 ppm level, both fumed silica and colloidal silica produced acceptable bottles, bottles in which the haziness was only slightly greater than that of the control. At the 1500 ppm level, haziness was at levels unacceptable for clear bottles, but is acceptable for other bottle uses where clarity is not a concern.

KPL-155 is an internal lubricant added to the PET resin and designed to bloom to the bottle surface and lower surface energy and interactions. While it produced bottles with acceptable haze at both levels evaluated, it was deemed not acceptable with regard to decreasing stickiness even though the resin containing KPL-155 had a lower static coefficient of friction than the control.

In addition to static coefficient of friction studies, bottles were also evaluated using optical microscopy. Samples of bottles made from the control PET resin, PET plus 1500 ppm fumed silica (PET-FS), PET plus 1500 ppm colloidal silica (PET-CS), and PET plus 150 ppm silica beads (PET-SB) were evaluated. The microscopy studies indicate that all three silica additives cause a dramatic increase in the surface roughness of the bottle. In contrast, bottles made using the control resin without a silica substance are relatively smooth, containing few bumps or protuberances. The data in Table 1 indicates that the use of silicas in accordance with the invention can reduce the static coefficient of friction in bottles by about 40% to about 80%.

It was also noted that the walls of bottles made from resins containing fumed silica or colloidal silica were different from the walls of bottles containing silica beads. PET-FS and PET-CS surfaces are characterized by having a granular texture, somewhat reminiscent of sandpaper. The PET-SB walls are characterized by distinct bumps, larger in size and more clearly defined than the bumps present in PET-FS and PET-CS walls. These differences are traceable to the physical characteristics of the silica substances themselves. The crystallinity of the control and the various silica-containing resins were also determined and only very small differences in crystallinity were found.

Although the invention has been described with preferred embodiments, it is to be understood that variation and modifications may be employed without departing from the concept of the invention as defined in the following claims.

We claim:

1. A resin consisting essentially of a polyester and fumed silica, wherein said fumed silica is contained in said polyester and includes particles having a size greater than 1000 nm and said polyester containing said silica is suitable for the manufacture of clear polyester bottles.

2. The resin according to claim 1, wherein said polyester is selected from the group consisting of polyesters made from
    (a) a dicarboxylic acid selected from the group consisting of terephthalic acid, isophthalic acid, 4,4'-biphenyl dicarboxylic acid, naphthalene dicarboxylic acid, 4,4'-bicyclohexane dicarboxylic acid, malonic acid, suberic acid, maleic acid, glutaric acid succinic acid, adipic acid, sebacic acid and fumaric acid, and mono- and dialkyl esters thereof; and
    (b) a polyol selected from the group consisting of ethylene glycol, diethylene glycol, triethylene glycol, 1,4-cyclohexane diol, propylene glycol, butylene glycol, dipropylene glycol, 1,3-propanediol, glycerol, 1,2-butanediol, 1,4-butanediol, pentaerythritol and neopentylglycol.

3. The resin according to claim 1, wherein the fumed silica has a particle size of from about 100 nm to about 30,000 nm.

4. The resin according to claim 3, wherein the particle sizes are from about 100 nm to about 20,000 nm.

5. The resin according to claim 4, wherein the particle sizes are from about 100 nm to about 5,000 nm.

6. The resin according to claim 2, wherein the fumed silica has a particle size of from about 100 nm to about 30,000 nm.

7. The resin according to claim 6, wherein the particle size is about 100 nm to about 20,000 nm.

8. The resin according to claim 7, wherein the particle size is from about 100 nm to about 5,000 nm.

9. A resin suitable for the production of clear beverage bottles, said resin consisting essentially of a polyester and a fumed silica, wherein said fumed silica is present in an amount sufficient to reduce the static coefficient of friction of a bottle made from the silica containing resin by about 80% relative to the same polyester resin without the silica and includes particles having a size greater than 1000 nm.

10. The resin according to claim 9, wherein said fumed silica has a particle size of about 100 nm to about 30,000 nm.

11. The resin according to claim 9, wherein said fumed silica has a particle size of about 100 nm to about 5,000 nm.

12. The resin according to claim 11, wherein said fumed silica has a mean particle size of about 100 nm to about 400 nm.

13. A resin suitable for the production of clear polyester bottles, said resin consisting essentially of a polyester and fumed silica, wherein said fumed silica is present in an amount of from about 50 to about 150 ppm and includes particles having a size greater than 1000 nm.

14. The resin according to claim 13, wherein said fumed silica has a particle size of about 100 nm to about 5000 nm.

15. The resin according to claim 13, wherein said fined silica has a mean particle size of about 100 nm to about 400 nm.

16. The resin according to claim 13, wherein said polyester is selected from the group consisting of polyesters made from
    (a) a dicarboxylic acid selected from the group consisting of terephthalic acid, isophthalic acid, 4,4'-biphenyl dicarboxylic acid, naphthalene dicarboxylic acid, 4,4'-bicyclohexane dicarboxylic acid, malonic acid, suberic acid, maleic acid, glutaric acid, succinic acid, adipic acid, sebacic acid and fumaric acid, and mono- and dialkyl esters thereof; and (b) a polyol selected from the group consisting of ethylene glycol diethylene glycol, triethylene glycol, 1,4-cyclohexane diol, propylene glycol, butylene glycol, dipropylene glycol, 1,3-propanediol, glycerol, 1,2-butanediol, 1,4-butanediol pentaerythritol and neopentylglycol.

17. The resin according to claim 16, wherein said fumed silica has a particle size of about 100 nm to about 5000 nm.

18. A polyester bottle made from the resin according to claim 1.

19. A polyester bottle made from the resin according to claim 2.

20. A polyester bottle made from the resin according to claim 5.

21. A polyester bottle made from the resin according to claim 8.

22. A polyester bottle made from the resin according to claim 9.

23. A polyester bottle made from the resin according to claim 11.

24. A polyester bottle made from the resin according to claim 13.

25. A polyester bottle made from the resin according to claim 16.

26. A polyester bottle made from the resin according to claim 17.

27. A polyester bottle made from a resin comprising a polyester and a fumed silica, wherein said polyester containing said silica is suitable for the manufacture of bottles.

28. A polyester bottle according to claim 27, wherein said polyester is selected from the group consisting of polyesters made from (a) a dicarboxylic acid selected from the group consisting of terephthalic acid, isophthalic acid, 4,4'-biphenyl dicarboxylic acid, naphthalene dicarboxylic acid, 4,4'-bicyclohexane dicarboxylic acid, malonic acid, suberic acid, glutaric acid, succinic acid, adipic acid, sebacic acid, maleic acid and fumaric acid, and mono- and dialkyl esters thereof; and (b) a polyol selected from the group consisting of ethylene glycol, diethylene glycol, triethylene glycol, 1,4-cyclohexane diol, propylene glycol, butylene glycol, dipropylene glycol, 1,3-propanediol, glycerol, 1,2-butanediol, 1,4-butanediol, pentaerythritol and neopentylglycol.

29. A polyester bottle according to claim 28, wherein the silica has a particle size of from about 100 nm to about 5,000 nm.

30. A polyester bottle according to claim 28, wherein the silica has a particle size of from about 100 nm to about 20,000 nm and is present in an amount from about 50 ppm to about 2500 ppm by weight, based on the weight of the resin.

31. A polyester bottle according to claim 27, wherein the silica has a particle size of from about 100 to about 5,000 nm.

32. A polyester bottle according to claim 31, wherein the amount of silica is from about 50 ppm to about 2500 ppm by weight, based on the weight of the resin.

33. A polyester bottle made from a resin suitable for the production of beverage bottles, said resin consisting essentially of a polyester and a fumed silica, wherein said fumed silica is present in an amount sufficient to reduce the static coefficient of friction of a bottle made from the silica-containing resin by about 80% relative to the same polyester resin without the silica.

34. A polyester bottle according to claim 33, wherein the fumed silica has a particle size of about 100 nm to about 5,000 nm.

35. A polyester bottle according to claim 34, wherein the fumed silica has a particle size of about 100 nm to about 1,000 nm.

36. A polyester bottle made from a resin suitable for the production of clear polyester bottles, said resin comprising a polyester and fumed silica, wherein said fumed silica is present in an amount of from about 50 ppm to about 150 ppm.

37. A polyester bottle according to claim 36, wherein said polyester is selected from the group consisting of polyesters made from (a) a dicarboxylic acid selected from the group consisting of terephthalic acid, isophthalic acid, 4,4'-biphenyl dicarboxylic acid, naphthalene dicarboxylic acid, 4,4'-bicyclohexane dicarboxylic acid, malonic acid, suberic acid, glutaric acid, succinic acid, adipic acid, sebacic acid, maleic acid and fumaric acid, and mono- and dialkyl esters thereof; and (b) a polyol selected from the group consisting of ethylene glycol, diethylene glycol, triethylene glycol, 1,4-cyclohexane diol, propylene glycol, butylene glycol, dipropylene glycol, 1,3-propanediol, glycerol, 1,2-butanediol, 1,4-butanediol, pentaerythritol and neopentylglycol.

38. A polyester bottle according to claim 37, wherein the fumed silica has a particle size of about 100 nm to about 5000 nm.

39. A polyester bottle according to claim 38, wherein the fumed silica has a particle size of about 100 nm to about 1000 nm.

40. A polyester bottle according to claim 27 wherein the silica is fumed silica having a particle size from about 100 nm to about 30,000 nm.

41. A polyester bottle according to claim 40 wherein the silica has a particle size from about 100 nm to about 1500 nm.

42. A resin according to claim 1 wherein fumed silica is the only silica present.

43. A polyester bottle made from the resin according to claim 42.

44. A resin according to claim 1 wherein the fumed silica has an aggregate particle size greater than 100 nm.

45. A polyester bottle made from a resin consisting essentially of a polyester and fumed silica, wherein said fumed silica is contained in said polyester and said polyester containing said silica is suitable for the manufacture of clear bottles.

* * * * *